Aug. 15, 1939.  T. T. YOUNGFELT ET AL  2,169,575
BOARD CUTTING MACHINE
Filed Nov. 15, 1937   5 Sheets-Sheet 1
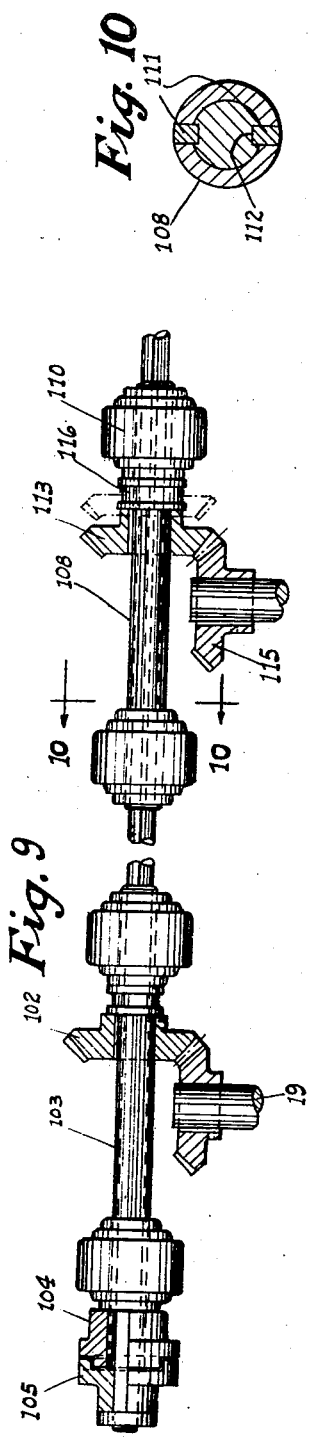
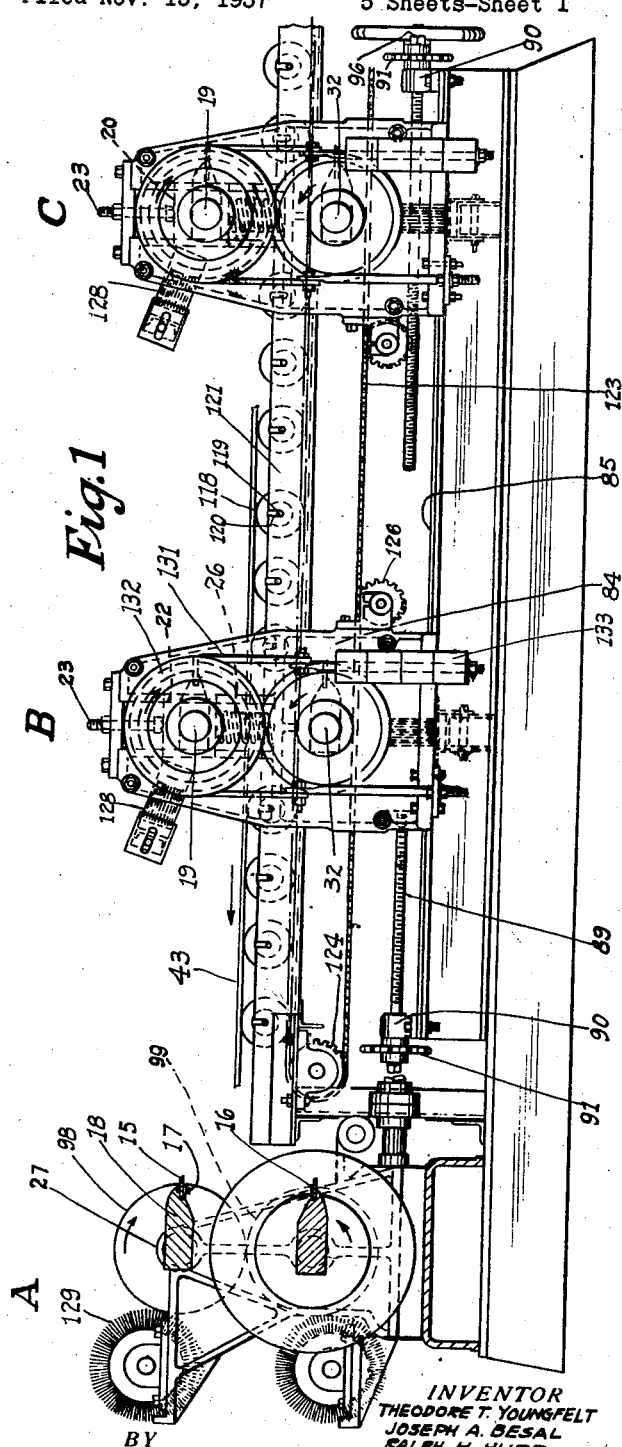
INVENTOR
THEODORE T. YOUNGFELT
JOSEPH A. BESAL
RALPH H. HURD.
BY
ATTORNEY

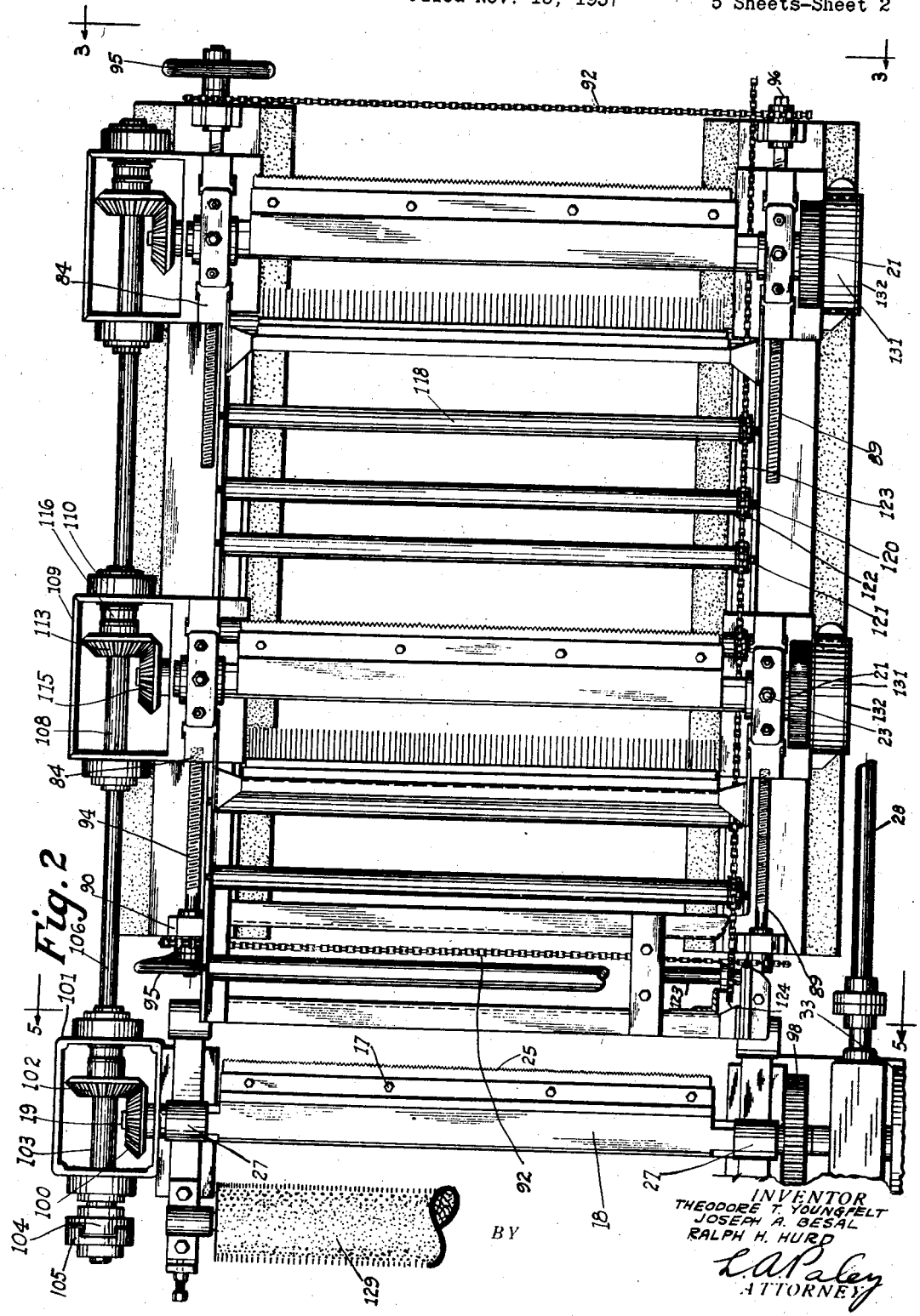

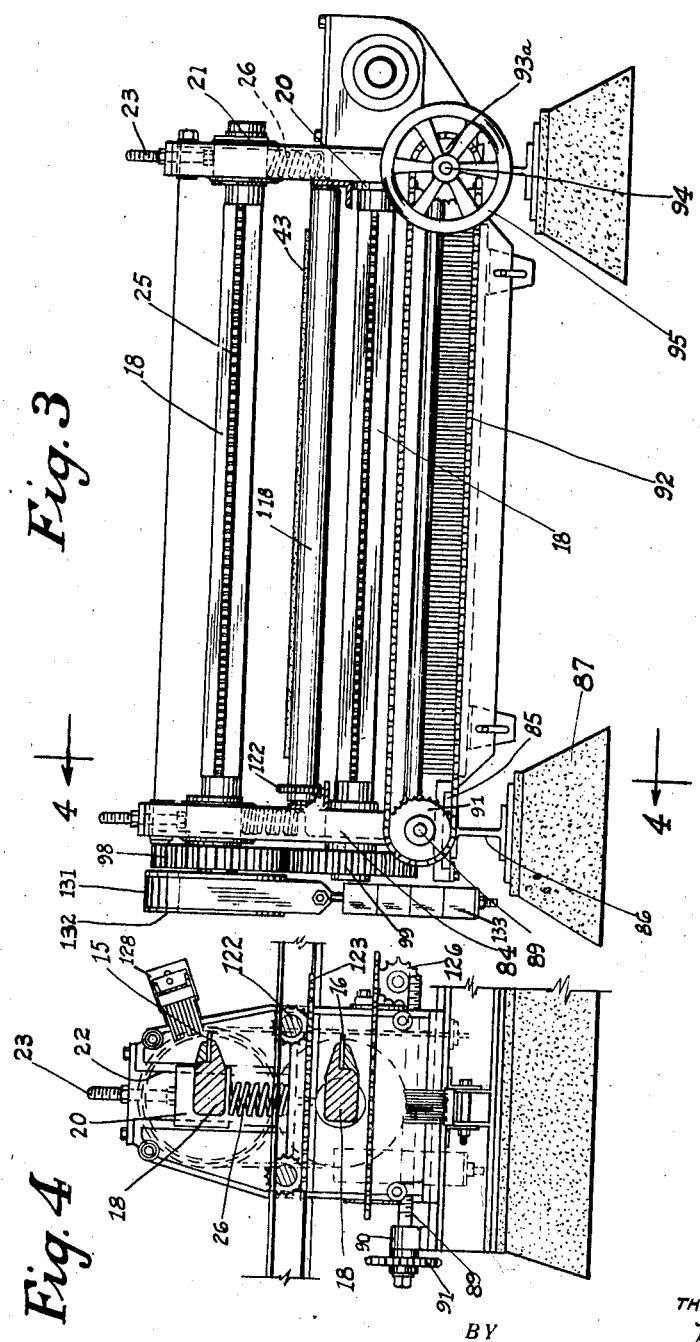

Aug. 15, 1939 T. T. YOUNGFELT ET AL 2,169,575
BOARD CUTTING MACHINE
Filed Nov. 15, 1937 5 Sheets-Sheet 4
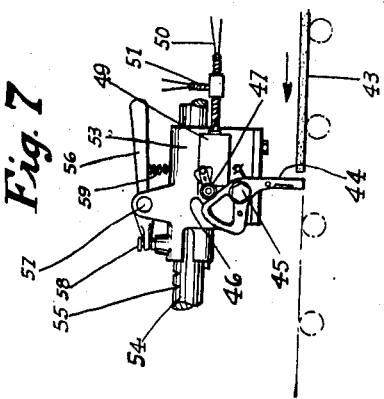
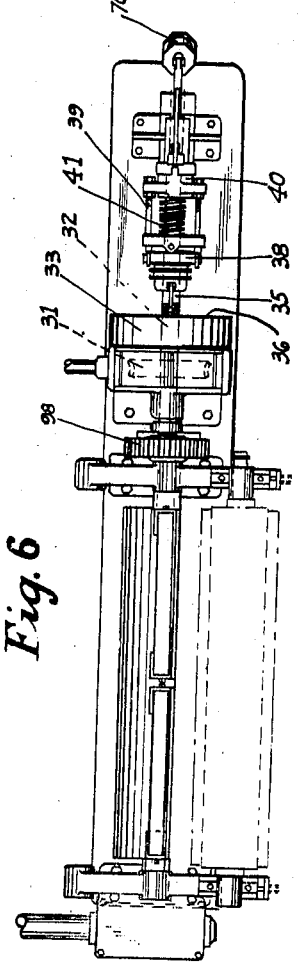
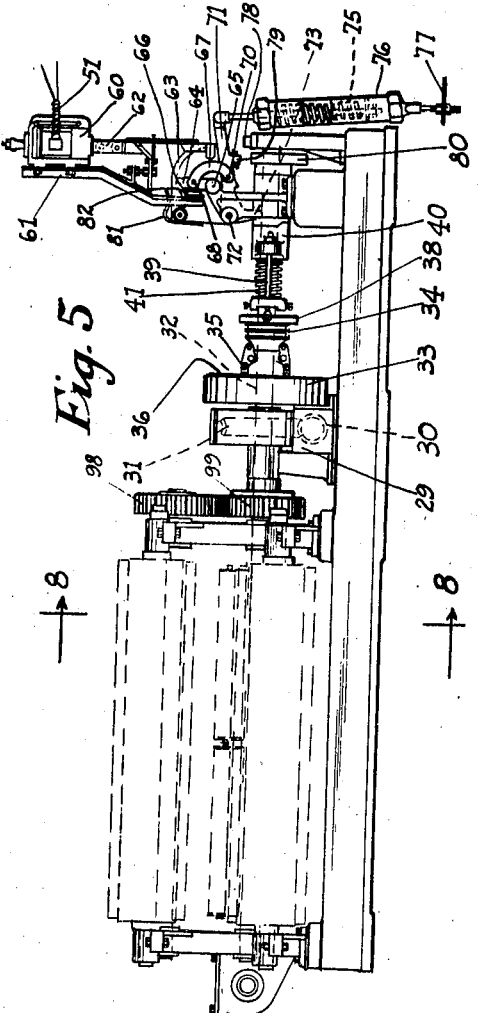
INVENTOR
THEODORE T. YOUNGFELT
JOSEPH A. BESAL
BY RALPH H. HURD.
ATTORNEY Aug. 15, 1939. T. T. YOUNGFELT ET AL 2,169,575
BOARD CUTTING MACHINE
Filed Nov. 15, 1937 5 Sheets-Sheet 5

INVENTOR
THEODORE T. YOUNGFELT
JOSEPH A. BESAL
RALPH H. HURD.
BY
ATTORNEY

Patented Aug. 15, 1939

2,169,575

UNITED STATES PATENT OFFICE 2,169,575

BOARD-CUTTING MACHINE

Theodore T. Youngfelt, Hinsdale, Joseph A. Besal, Chicago, and Ralph H. Hurd, Hinsdale, Ill., assignors to United States Gypsum Company, Chicago, Ill., a corporation of Illinois Application November 15, 1937, Serial No. 174,598

10 Claims. (Cl. 164—68)

This invention relates to machines for cutting a continuous stream of composition board into the desired lengths.

In the manufacture of composition boards, such as those having a gypsum composition core and paper cover sheets, it is customary to make these boards in the form of a continuous strip which is cut off into individual boards prior to passage through a drying kiln. In view of the fact that it is desirable to change board length from time to time, it is important that mechanism be provided which will readily permit this change in length.

An object of this invention therefore, is to provide a practical machine for cutting composition board into lengths.

Another object of the invention is to provide a machine of the class described which may be readily adjusted to cut boards of different lengths; also to improve board cutting machines in other respects hereinafter specified and claimed.

Figure 11:
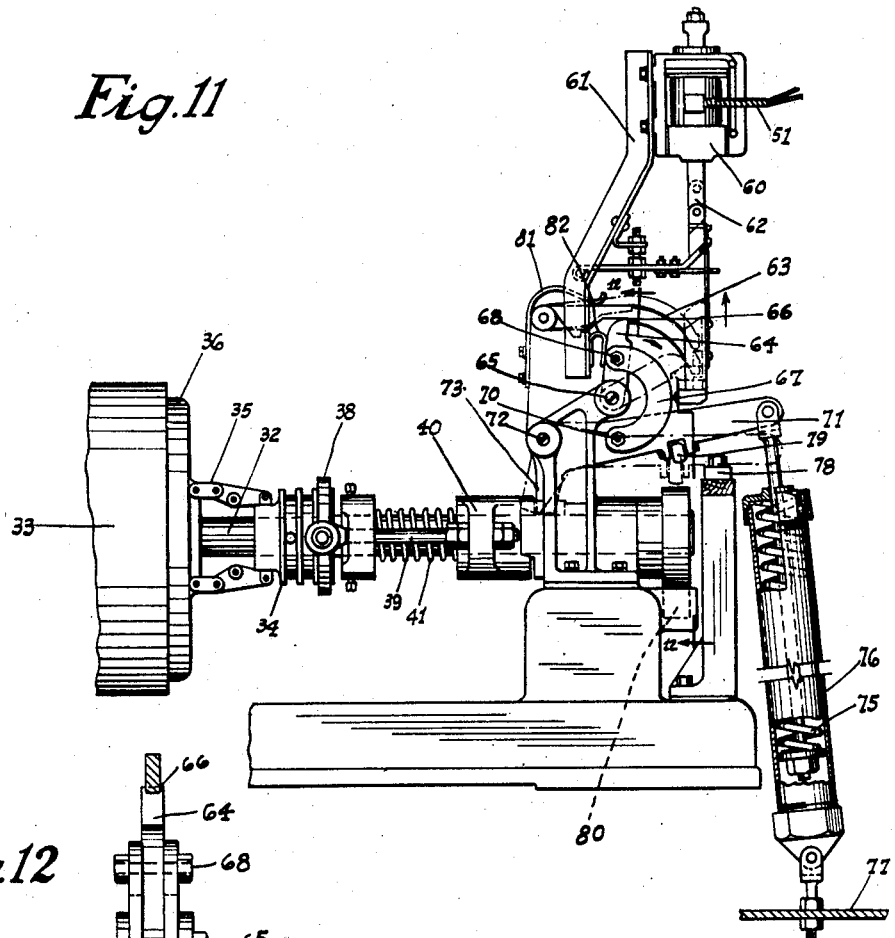
Figure 12:
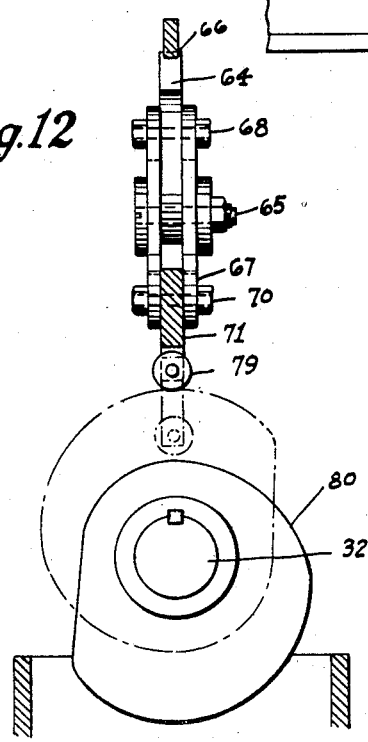

Reference is to be had to the accompanying drawings forming a part of this specification, in which Fig. 1 is a side elevation of the board cutting machine, Fig. 2 is a plan view of the machine, Fig. 3 is a transverse sectional elevation of the machine taken on line 3—3 of Fig. 2, Fig. 4 is a longitudinal sectional elevation of the machine taken on line 4—4 of Fig. 3, Fig. 5 is a sectional elevation through the machine taken on line 5—5 of Fig. 2, Fig. 6 is a plan view of one of the cutting machines, Fig. 7 is an end view of a switch mechanism controlling the operation of a cutting machine, Fig. 8 is a sectional elevation through a cutting machine taken on line 8—8 of Fig. 5, Fig. 9 is a sectional plan view of the driving mechanism for the cutting knives, Fig. 10 is a sectional elevation of the driving mechanism taken on line 10—10 of Fig. 9, Fig. 11 is a side elevation on a large scale of the one revolution clutch mechanism, and Fig. 12 is a sectional elevation through the clutch mechanism taken on line 12—12 of Fig. 11.

The machine to be described is employed in cutting gypsum or other composition boards which usually are made in a continuous length of a core comprising mainly of gypsum, and paper cover sheets facing each surface of the board. The plastic composition is formed on the lower cover sheet, the edges of the lower cover sheet are folded over, the upper cover sheet is applied by a master roll, and the core is allowed to set to solid condition on a continuous belt conveyor. When wall board 32 or 48 inches wide is manufactured on the machine, it is customary to cut the continuous stream of board into lengths of 4, 5, 6, 7, 8, 9, 10, 11 and 12 feet. When plaster board 16 inches wide is manufactured on the machine, it is ordinarily cut into lengths of 32 or 48 inches. Because of the short lengths of plaster boards produced, it is desirable to only completely cut off every third board while intermediate boards have the cover sheets transversely perforated to be broken apart manually after passing through the drying kiln. By following this practice, the capacity of the drying kiln is not reduced as it would be if a multiplicity of small individual boards were conveyed through the drying kiln. It is evident that a cutting and perforating machine must be highly flexible and amenable to quick changes and adjustments in order to meet the variety of manufacturing conditions.

In order to accomplish the desired results, we have designed a cutting and perforating machine comprising a plurality of pairs of cutting or perforating knives, such as three in number as illustrated. These pairs of knives may be positioned at stations A, B and C (Fig. 1) and the distance between the pairs of knives can be readily adjusted at will to produce boards of the desired lengths. Cutting or perforating knives 15 and 16 are secured by bolts 17 to a knife holder 18 which is preferably formed of forged steel and has its ends rounded to form trunnions 19 which are rotatably mounted in bearings 20 and 21. The bearings 21 are slidably mounted in vertical guides 22 and are provided with adjusting screws 23 so that the distance between the knives 15 can be accurately adjusted to accomplish a complete cutting off of the board, or merely the transverse perforation of the cover sheets of the board.

Each of the knives 15 and 16 is provided with serrated edges 25 so that if the knives are set for perforating, the teeth of the knife edges will provide a row of transverse perforations in the cover sheets of the board. The adjustable bearings 21 at stations B and C are adjustably mounted in the slides 22, being supported by compression springs 26 so that the knives at these stations can be adjusted for either perforating or cutting off the board, as desired. Bearings 27 at station A are rigidly mounted so that the knives at station A always are set for cutting off the board.

In order to accomplish the rotation of the knives, a shaft 28 is continuously rotated by a source of power, such as an electric motor, not shown, said shaft leading into a gear box 29 and having a worm 30 secured to the end of said shaft inside the gear box 29. The worm 30 meshes with a worm gear 31 which is rotatably mounted on a knife shaft 32 and is rigidly connected to a clutch 33. A collar 34 is slidably mounted on the knife shaft 32 and is provided with a feather key so that said collar always rotates with the shaft 32, but may be moved axially of said shaft. Toggle arms 35 connect the collar 34 to a clutch plate 36. A collar 38 is rotatably mounted on the collar 34 and is connected by a pair of links 39 to a yoke 40 which is mounted on the shaft 32. A compression spring 41 normally tends to urge the yoke 40 to the right (Fig. 5), thus tending to disengage the one revolution clutch 32.

It is desirable to have the knives 15 and 16 rotate through one revolution when the composition board 43 has reached a predetermined point so that its forward end strikes against a trip lever 44. The lever 44 is pivotally mounted on a pin 45 and is provided at its opposite end with a cam surface 46 against which the electric switch roller 47 contacts so that when the lever 44 is moved in a clockwise direction (Fig. 7), the roller 47 rides up on the cam surface 46 and closes an electric switch inside of a switch box 49. An upper inlet conduit 50 leads into the switch box 49 and a branch conduit 51 leads to a knife clutch actuating mechanism to be hereinafter described. The switch box 49 is secured to a bracket 53 which is slidably mounted on a rod 54 extending longitudinally of the machine above the path of travel of the boards 43. A series of pin holes 55 are formed in the upper side of the rod 54 and a lever 56 is pivotally mounted on bracket 53 by a pivot pin 57. The lever 56 is provided at one end with a pin 58 engaging in one of the pin holes 55, compression spring 59 serving to maintain pin 58 in engagement with a pin hole 55. By manually actuating the lever 56, the bracket 53 and switch lever 44 can be moved longitudinally of the machine to regulate the length of the board cut-off by regulating the point at which the forward end of the board actuates the lever 44. The branch conduit or electrical circuit 51 is connected to a solenoid 60 which is suitably mounted on a bracket 61 and is connected by a link 62 to an arcuate catch lever 63. A lever 64 is pivotally mounted at one end on a fixed pin 65 and is provided with a latching point which engages behind a shoulder 66 formed on the arcuate lever 63. An arcuate link 67 is pivotally connected at one end by a pin 68 to the lever 64 and is pivotally connected at the other end by pin 70 to a bell crank lever 71. The lever 71 is pivotally mounted on a fixed pin 72 and is provided with a bifurcated lever arm 73 which engages against the yoke 40 so as to move the yoke 40 to the left (Fig. 5) when the lever 71 is moved in a clockwise direction under the action of a spring 75 enclosed within a spring cylinder 76, the latter being secured at one end to a bracket 77. A stop member 78 of fiber or other suitable material tends to limit the clockwise movement of lever 71. A roller 79 is rotatably mounted on the lower part of lever 71 and is adapted to engage a cam 80 which is rigidly mounted on the outer end of knife shaft 32. Suitable flat springs 81 and 82 are provided adjacent levers 63 and 64 so as to properly control the operation of said levers. With the mechanism described, when the forward end of the board 43 actuates lever 44, the train of mechanism heretofore described will be set into motion and the one revolution clutch will accomplish a single revolution of the knives 15 and 16, thus cutting off or perforating the board.

One of the salient features of the invention consists in means for varying the distance between the knives at stations A, B and C to enable the operator to cut off boards of any desired length. For this purpose a bearing carriage 84 supports the knives 15 and 16 at stations B and C, said carriages being slidably mounted longitudinally of the machine on slide plates 85. The plates 85 are rigidly secured to longitudinal eye beams 86 which are suitably supported on foundation bases 87. Threaded adjusting rods 89 are rotatably mounted in bearings 90, one end of each rod 89 engaging in a threaded opening on a carriage 84 at stations B and C. A sprocket wheel 91 is mounted upon each of the rods 89 and is connected by a chain 92 to a sprocket wheel 93 on a similar adjusting rod 94 at the opposite side of the machine. A hand wheel 95 is provided on each of the rods 94 so that upon the manual rotation of said hand wheel 95, the two rods 89 and 94 rotate in unison so as to move the carriage 84 backward or forward as the case may be, on the side plates 85. While this mechanism described locates the knives 15 and 16 fairly accurately at right angles to the board 43, final adjustment can be made through the use of a hand wrench on a squared end 96 on the end of each rod 89.

The knife holders 18 are caused to rotate in unison by a pair of spur gears 98 and 99 which are secured to knife shafts or trunnions 19 and 32 at all three stations A, B and C. In order to cause the rotation of the knives 15 and 16 at stations B and C, a bevel gear 100 is mounted on trunnion 19 within a gear case 101, said gear 100 meshing with a beveled gear 102 which is rigidly secured on a sleeve 103. The jaw clutch 104 is also rigidly secured to the sleeve 103 and engages with a mating clutch plate 105 which is slidably mounted on a shaft 106 by means of a feather key which permits axial movement of said clutch plate 105.

The knife driving arrangement at stations B and C are substantially identical, and a description of the driving mechanism at station B will suffice also for the mechanism at station C. It will be noted that the knives at stations B and C are both mounted so as to be readily moved longitudinally of the machine to cut-off or perforate boards of different lengths. For this purpose a sleeve 108 is mounted on shaft 106 within a gear box 109, said gear box being provided with bearings 110 for rotatably supporting said shaft and still permit movement of the gear box 109 axially of said shaft 106. The sleeve 108 is provided with diametrically opposite keys 111 which engage in longitudinal key ways 112 formed over a considerable distance of the shaft 106. A beveled gear 113 is mounted on the sleeve 108 by a feather key which permits axial movement of said beveled gear 113 along the sleeve 108, but prevents any rotating movement of said gear 113 relative to said sleeve 108. The gear 113 meshes with a beveled gear 115 which is mounted on the end of one of the knife trunnions 19. A split collar 116 is interposed between the gear 113 and one of the bearings 110 so that said collar can be readily removed and the gear 113 moved to the right (Fig. 2) to completely disengage one or both of the sets of knives at stations B and C, to cause said knives to become inoperative, long boards being cut-off completely by the knives at station A.

In order to convey the boards 43 between the knives 15 and 16, we provide a series of conveyor rollers 118 which are mounted on roller shafts 119, the ends of which are rotatably received in bearing slots 120 formed in the upstanding leg 121 of conveyor angles, which are rigidly supported on the framework of the machine. A sprocket pinion 122 is rigidly connected to the end of each conveyor roll 118, said sprocket wheels 122 meshing with a drive chain 123 which passes around a sprocket wheel 124 and around a power driven sprocket pinion, not shown. The lower reach of chain 123 is supported on idler sprocket wheels 126. Thus the rollers 118 can be readily lifted from the bearing slots 120 to be relocated and provide clearance as the knives at stations B and C are moved backward and forward to cut off boards of different lengths. Suitable flat brushes 128 are rigidly supported adjacent the knives at stations B and C to contact with the serrated edges 25 of said knives, and keep said knives clean at all times. Round brushes 129 are fixedly supported adjacent the knives at station A for the same purpose. A brake drum 132 is mounted on the trunnion 19 of the upper knife shaft at stations B and C, and a brake strap 131 passes around said brake drum 132, being pressed thereagainst by means of a suspended weight 133. The brake strap 131 prevents backlash in the spur gears 98 and 99 when the distance between the knife shafts is slightly varied to either perforate or cut off the board, thus causing the knives 15 and 16 to accurately register in making the cut.

In operation the stream of board 43 passes between the knives 15 and 16 at stations A, B and C until the forward end of said board strikes the trip lever 44. This lever 44 then closes the switch 47 thus energizing the electrical circuit 51, solenoid 60, and actuating the one revolution clutch 36 through the train of mechanism 62—82. The actuation of the one revolution clutch 36 causes the knives 15 and 16 at each of the stations A, B and C to be rotated through one revolution and cut-off or perforate a board according to the setting of the knives, as determined by the adjusting screws 23 on adjustable bearings 20. The carriages 84 at stations B and C are adjusted longitudinally of the machine to cut off boards of different lengths by means of threaded rods 94 rotated through hand wheels 95 and connecting chains 92. One or both of the knives at stations B and C may be disconnected and made inoperative by removing split collars 116 and sliding the beveled gears 113 out of mesh with beveled gears 115 or by disconnecting clutch plate 105. The rollers 118 for conveying the board 43 between the knives 15 and 16, are rotated by means of a sprocket wheel 122 on one end of each roller 118, said sprocket wheels engaging a drive chain 123, or the rollers 118 may be readily removed from bearing slots 120 to relocate said rollers and give clearance for the movement of carriages 84. Brake straps 131 are pressed against brake drums 132 connected to the upper knives at stations B and C so as to cause the knives 15 and 16 to accurately register at the time of cutting or perforating without backlash in the spur gears 98 and 99.

We would state in conclusion that while the details illustrated and described constitute a practical embodiment of our invention, we do not wish to limit ourselves precisely to these details, since manifestly, the same may be considerably varied without departing from the spirit of the invention as defined in the appended claims.

Having thus described our invention, we claim as new and desire to secure by Letters Patent:

1. In a board cutting machine, a series of pairs of rotary cutting knives arranged in spaced relation, means for continuously moving a stream of composition board between said knives, a carriage for rotatably supporting each pair of knives, and means for moving said carriages longitudinally of said board stream to vary the distance between the pairs of knives and thus cut off boards of varying predetermined length.

2. In a board cutting machine, a plurality of pairs of rotary cutting knives arranged in spaced relation, means for continuously moving a stream of composition board between said knives including a series of removable conveyor rollers, means for varying the distance between said pair of knives so as to vary the length of boards cut off by said knives, and means for shifting the position of said conveyor roll to provide clearance for said knives when the distance between said pairs of knives is changed.

3. In a board cutting machine, a series of pairs of rotary cutting knives arranged in spaced relation along a horizontal path, a carriage for rotatably supporting each pair of knives, screw means associated with each carriage arranged to move each carriage along said path and vary the distance between said pairs of knives, and conveyor means for moving a stream of board between said knives to be cut to predetermined length.

4. In a board cutting machine, a series of pairs of rotary cutting knives arranged in spaced relation, means for continuously moving a stream of composition board between said knives to be cut to length, a drive shaft common to all of said knives and adapted to cause the simultaneous rotation of said knives so as to cut said board to predetermined length, and clutch means on said shaft for disconnecting some of said knives and thus cut boards of longer lengths.

5. In a board cutting machine, a series of pairs of rotary cutting knives arranged in spaced relation, means for varying the distance between the pairs of knives, a plurality of conveyor rollers adapted to convey a continuous stream of composition board between said knives, a drive chain having a reach thereof arranged to travel adjacent said rollers, and a sprocket fixed to each roller and engaging said drive chain, said rollers being removable for relocating to provide clearance for said knives.

6. In a board cutting machine, a plurality of pairs of rotary cutting knives arranged in spaced relation, means for continuously moving a continuous stream of board between said knives, and means actuated by a cut end of said board for causing the simultaneous rotation of said pairs of knives through one revolution to cut and perforate said board.

7. In a board cutting machine, a series of pairs of cooperating cutting knives, means for continuously moving a stream of composition board between said knives, a drive shaft operatively connected to said knives, a one revolution clutch associated with said drive shaft, and trip means adapted to be actuated by a cut end of said board and act through said clutch and cause one revolution of said knives to sever a board.

8. In a board cutting machine, a plurality of pairs of cutting knives in spaced relation, meshing spur gears arranged to cause the rotation of each pair of knives, means for varying the distance between said knives to perforate the board to a predetermined extent by changing the meshing contact of the teeth of said gears, and a brake associated with one knife arranged to prevent back lash between said knives.

9. In a board cutting machine, a plurality of pairs of cutting knives, means for continuously conveying a stream of composition board between said knives, means for varying the distance between said pairs of knives to alter the length of boards cut by said knives, and means for intermittently rotating said knives simultaneously through one revolution.

10. In a board cutting machine, a plurality of pairs of rotary cutting knives in spaced relation, means for varying the distance between said pairs of knives, so as to cut off boards of predetermined length, means actuated by the cut end of a board to cause the rotation of said knives, and means for conveying a continuous stream of board between said knives.

THEODORE T. YOUNGFELT.
JOSEPH A. BESAL.
RALPH H. HURD.